United States Patent

El-Antably et al.

[11] Patent Number: 6,008,562
[45] Date of Patent: Dec. 28, 1999

[54] ROTOR SECTION CONTAINMENT WITH STEEL PUNCHED STAR

[75] Inventors: Ahmed Mostafa El-Antably; Moshen M. Erfanfar, both of Indianapolis, Ind.

[73] Assignee: General Motors Corporation, Detroit, Mich.

[21] Appl. No.: 09/309,427

[22] Filed: May 11, 1999

Related U.S. Application Data

[62] Division of application No. 09/122,447, Jul. 24, 1998.

[51] Int. Cl.$^6$ .................................................. H02K 1/00
[52] U.S. Cl. ........................... 310/216; 310/216; 83/346; 83/329; 83/331; 198/570; 198/608; 29/596; 29/598; 29/609
[58] Field of Search .......................... 29/596, 598, 609; 198/570, 608; 83/346, 329, 331; 310/216

[56] References Cited

U.S. PATENT DOCUMENTS

| | | | |
|---|---|---|---|
| 1,538,196 | 5/1925 | Livingston | 310/216 |
| 2,547,599 | 4/1951 | Roters | 310/216 |
| 3,371,410 | 3/1968 | Gintovt | 29/598 |
| 3,528,334 | 9/1970 | Geschwender | 83/346 |
| 4,578,853 | 4/1986 | Wurth | 29/598 |
| 4,597,168 | 7/1986 | Oboshi et al. | 29/596 |
| 4,781,091 | 11/1988 | Nakaya | 83/107 |
| 4,864,175 | 9/1989 | Rossi | 310/156 |
| 4,993,290 | 2/1991 | Obradovic | 83/32 |
| 5,373,622 | 12/1994 | Neuenschwander | 29/596 |
| 5,449,963 | 9/1995 | Mok | 310/270 |
| 5,488,889 | 2/1996 | Kang | 83/886 |
| 5,537,731 | 7/1996 | Sassi | 29/598 |
| 5,744,893 | 4/1998 | Zhao et al. | 310/259 |
| 5,797,305 | 8/1998 | Harrod et al. | 83/37 |
| 5,831,367 | 11/1998 | Fei et al. | 310/217 |
| 5,879,278 | 3/1999 | Cox | 493/67 |
| 5,906,149 | 5/1999 | Criado | 83/659 |

Primary Examiner—Nestor Ramirez
Assistant Examiner—Thanh Lam
Attorney, Agent, or Firm—Margaret A. Dobrowitsky

[57] ABSTRACT

A rotor assembly for a synchronous reluctance machine has a plurality of steel punched star-shaped supports secured along a shaft at spaced locations for retaining a plurality of laminated rotor sections. The star-shaped supports have four equiangularly spaced arms having arcuate valleys disposed therebetween that define a plurality of channels for receiving the rotor sections. The rotor sections have a plurality of linearly-disposed apertures for receiving mounting members that extend radially from the valleys of the star-shaped supports. The portions of free ends of the mounting members that extend through the apertures, are stamped or formed to secure the rotor sections to the star-shaped supports. A rotor bar may be disposed within a concave cavity defined by the rotor sections to reduce audible noise produced as the rotor rotates at a high rate of speed.

3 Claims, 4 Drawing Sheets

ROTOR SECTION CONTAINMENT WITH STEEL PUNCHED STAR

This is a division of application Ser. No. 09/122,447, filed Jul. 24, 1998.

TECHNICAL FIELD

The present invention relates generally to synchronous speed reluctance machines. More particularly, the present invention relates to the construction of rotors for a reluctance type machine.

BACKGROUND OF THE INVENTION

It is to be understood that the present invention relates to generators as well as to motors, however, to simplify the description that follows a motor will be described with the understanding that the invention also relates to generators. With this understanding, a synchronous reluctance motor is a synchronous machine that has a stator with poly-phase windings forming a plurality of poles which are similar to those of induction motors. The synchronous reluctance motor also includes a rotor that does not use windings or permanent magnets but does have the same number of poles as the stator. By providing a rotating field in the stator windings, a magnetomotive force acts upon the rotor resulting in the rotor being driven at a synchronous speed proportional to the rotating field in the stator.

The synchronous reluctance rotor generally includes a plurality of rotor sections formed of magnetic laminations secured to a unitary core. The core has a central axial bore for receiving a shaft. The laminations are inserted between radially extending arms of the core which are formed with a smooth, arcuate recess therebetween. The laminations are secured in the recesses by means of radial fasteners that secure radially-opposing rotor sections to the core. The rotor sections are also secured together by end caps and axial fasteners. The end caps are cup-shaped members with an axially extending outer rim that is disposed about the outermost periphery of the laminations. The axial fasteners extend through the end caps and core to secure the end caps to the rotor. The rotor laminations may also be bonded to one another to the core using an epoxy or other adhesive material. A fill description of a synchronous reluctance rotor is disclosed in U.S. Pat. No. 5,296,733 also assigned to the assignee of the present invention.

SUMMARY OF THE INVENTION

It is, therefore, a primary object of the present invention to provide an improved rotor for a synchronous reluctance machine that contains the rotor sections to the shaft at low cost and increases ease of manufacturing.

It is another object of the present invention to provide an improved rotor for a synchronous reluctance machine that runs cooler than conventional rotors.

It is a further object of the present invention to provide an improved rotor that eliminates the need for adhesive bonding or curing to secure the laminations.

It is yet another object of the present invention to provide an improved rotor for a synchronous reluctance machine having punched steel star-shaped supports to support the laminations to the shaft which provides a more stiff and rigid rotor.

It is still another object of the present invention to provide an improved rotor for a synchronous reluctance machine that does not require the active rotor flux surface to be covered.

It is a further object of the present invention to provide an improved rotor for a synchronous reluctance machine having no end caps to contain the laminate sections and thus reducing the weight and length of the rotor.

These and other objects of the present invention, as well as the advantages thereof over existing and prior art forms, which will be apparent in view of the following detailed specification, are accomplished by means hereinafter described and claimed.

In accordance with the present invention, there is provided a rotor assembly for a synchronous reluctance motor that includes a plurality of star-shaped supports mounted in axially spaced-adjacency along a shaft to define a core having a plurality of axial channels. The star-shaped supports include a body portion having a central axial bore disposed therethrough for receiving the shaft. A valley is disposed between adjacent ones of a plurality of equiangularly spaced arms that extend generally radially from the body portion of the star-shaped supports. Each valley is generally arcuate in shape and provides a support surface for cradling laminated arcuate rotor sections in radially spaced relation to the shaft. A mounting member, having a free end, extends radially from the base of each valley. The rotor sections have a plurality of apertures disposed therethrough for receiving the free ends of the mounting elements, whereby the free ends are formed to retain the rotor sections within the axial channels defined by the valleys of the star-shaped supports.

In accordance with another aspect of the present invention, there is provided a method of manufacturing a rotor assembly for a synchronous reluctance machine. The method includes the steps of securing a plurality of star-shaped supports at axially spaced locations on a shaft to form a core having a plurality of axial channels and mounting elements radially extending from the base of the channels. A plurality of laminated rotor sections are mounted within the channels, wherein the rotor sections include a plurality of apertures for receiving free ends of the mounting members. The free ends of mounting elements are then formed to secure the rotor sections to the star-shaped supports.

In accordance with another aspect of the present invention, there is provided a system for forming laminated rotor sections of a synchronous reluctance motor. The system includes a mandrel for coiling a sheet of non-magnetic material therearound and an indexing machine for punching a plurality of apertures through the non-magnetic sheet material. The indexing machine includes a stamp having a plurality of punching elements and an actuator for operating the stamp. A controller drives the actuator at decreasing predetermined intervals to insure that the apertures of each laminate layer are aligned.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
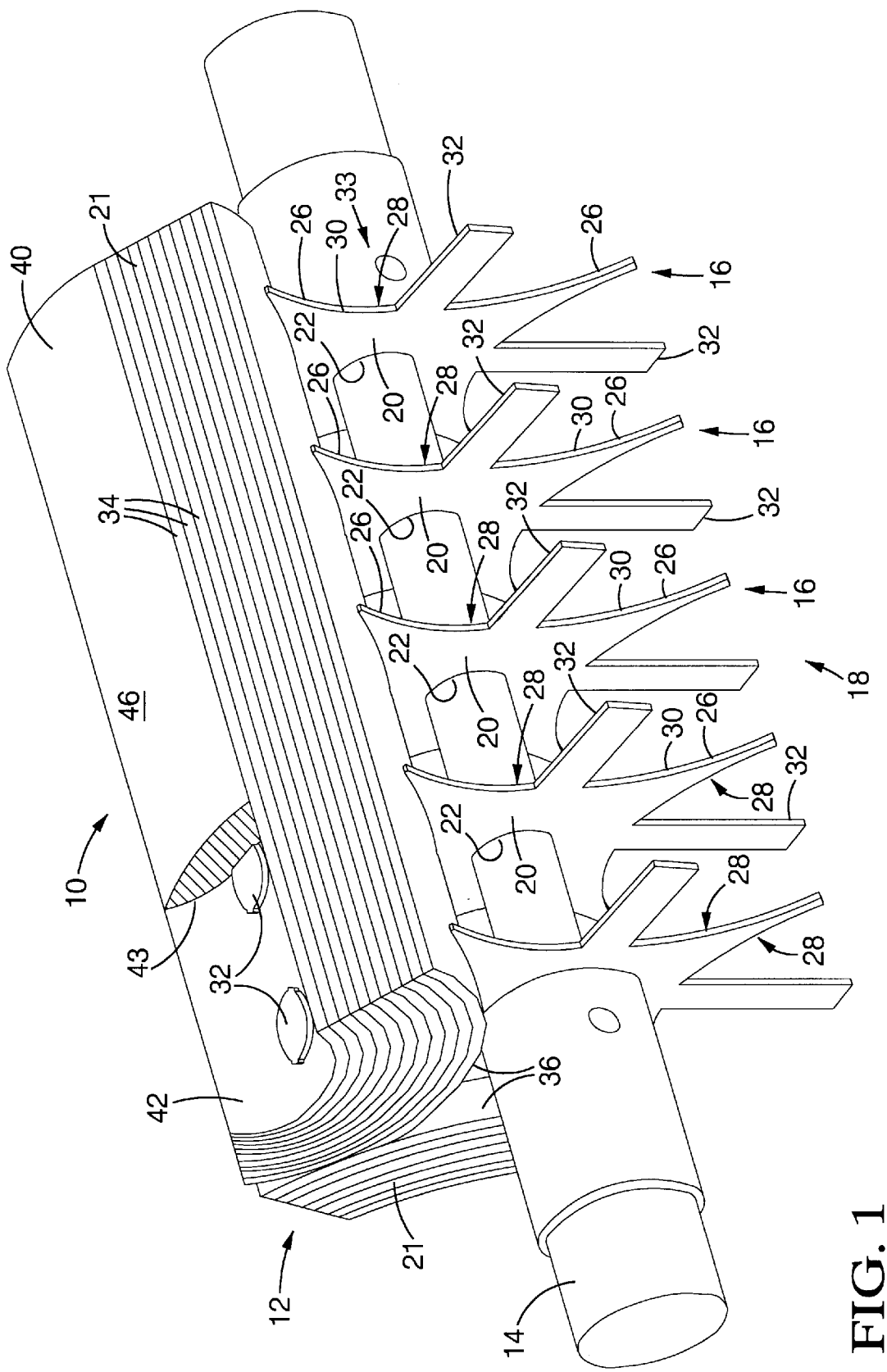
FIG. 1 is a perspective view of a partially assembled synchronous reluctance rotor assembly embodying the present invention having a portion of a rotor bar shown in cross section.

In FIG. 1, there is shown a rotor assembly for a synchronous reluctance motor, generally designated 10, of the type embodying the present invention. The rotor assembly 10 is comprised of a rotor 12 carried on a shaft 14. The rotor 12 has a plurality of star-shaped supports 16 secured along the shaft to form a core 18 for supporting a plurality of arcuate laminated rotor sections 21. The star-shaped supports 16 are formed of steel punched from sheet stock having a thickness of approximately 0.254 cm (0.100 inches) to provide a rigid core. Each star-shaped support 16 has a body portion 20 with a central axial bore 22 extending therethrough. Four equiangularly spaced arms 26 radiate outwardly from the body portion. Arcuate valleys 28 are disposed between the adjacent arms 26 which provide a surface 30 for supporting the rotor sections 21. A plurality of mounting members 32 extend from the body portion 20 at the base of each valley 28 for receiving and containing each rotor section, as will be described in greater detail hereinafter.

The star-shaped supports 16 are preferably press fit onto the shaft 14 at defined equi-spaced locations to form the core 18. Each star-shaped support 16 is identically oriented on the shaft 14 so that the mounting members 32 and valleys 28 are aligned along the axis of the shaft to provide axial channels 33 for receiving the rotor sections 21. One skilled in the art will appreciate that the star-shaped supports 16 may be secured to shaft 14 using other methods, such as by welding or use of an adhesive.

Figure 3:
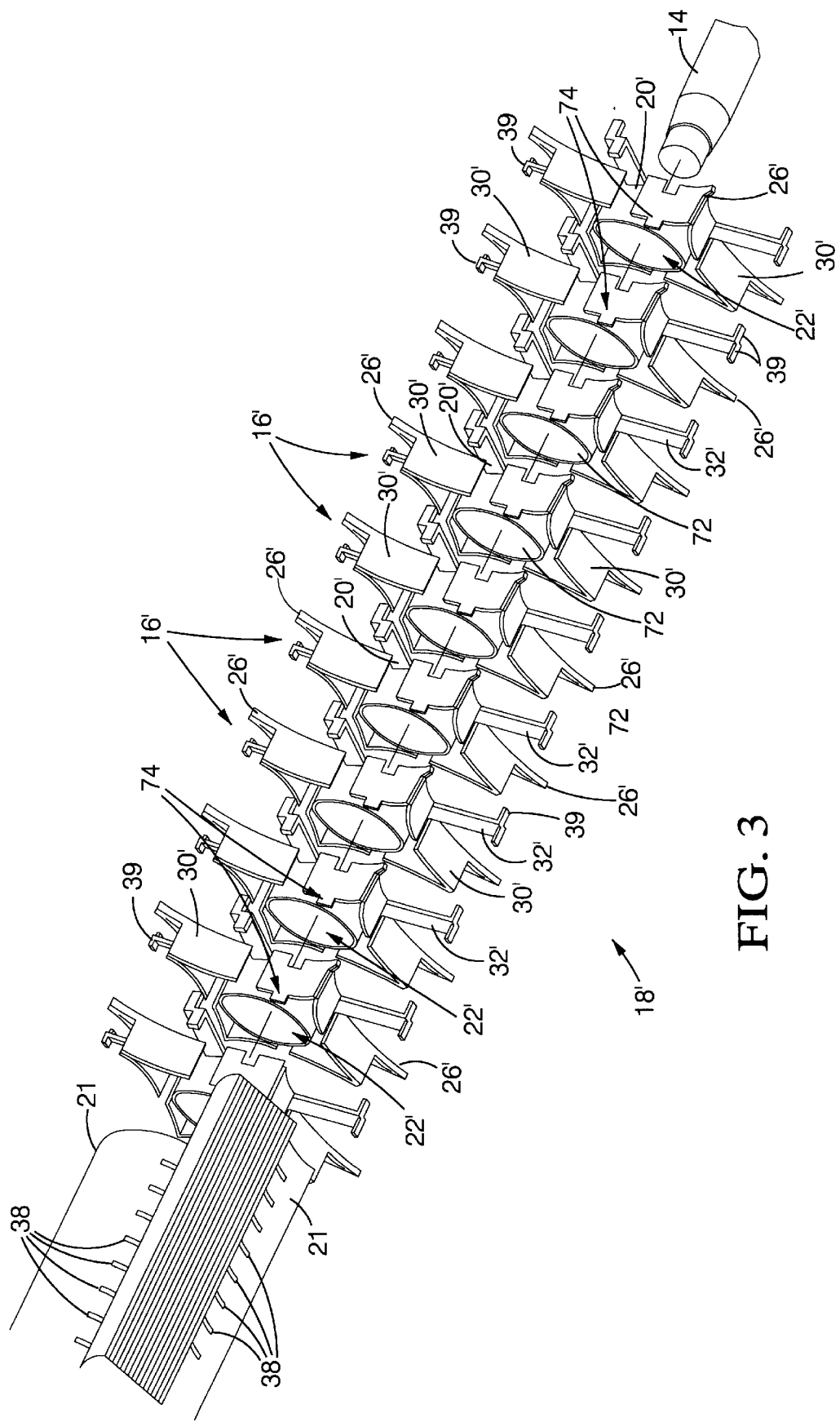
FIG. 3 is a disassembled, perspective view of a synchronous reluctance rotor assembly embodying the present invention.
Figure 4:
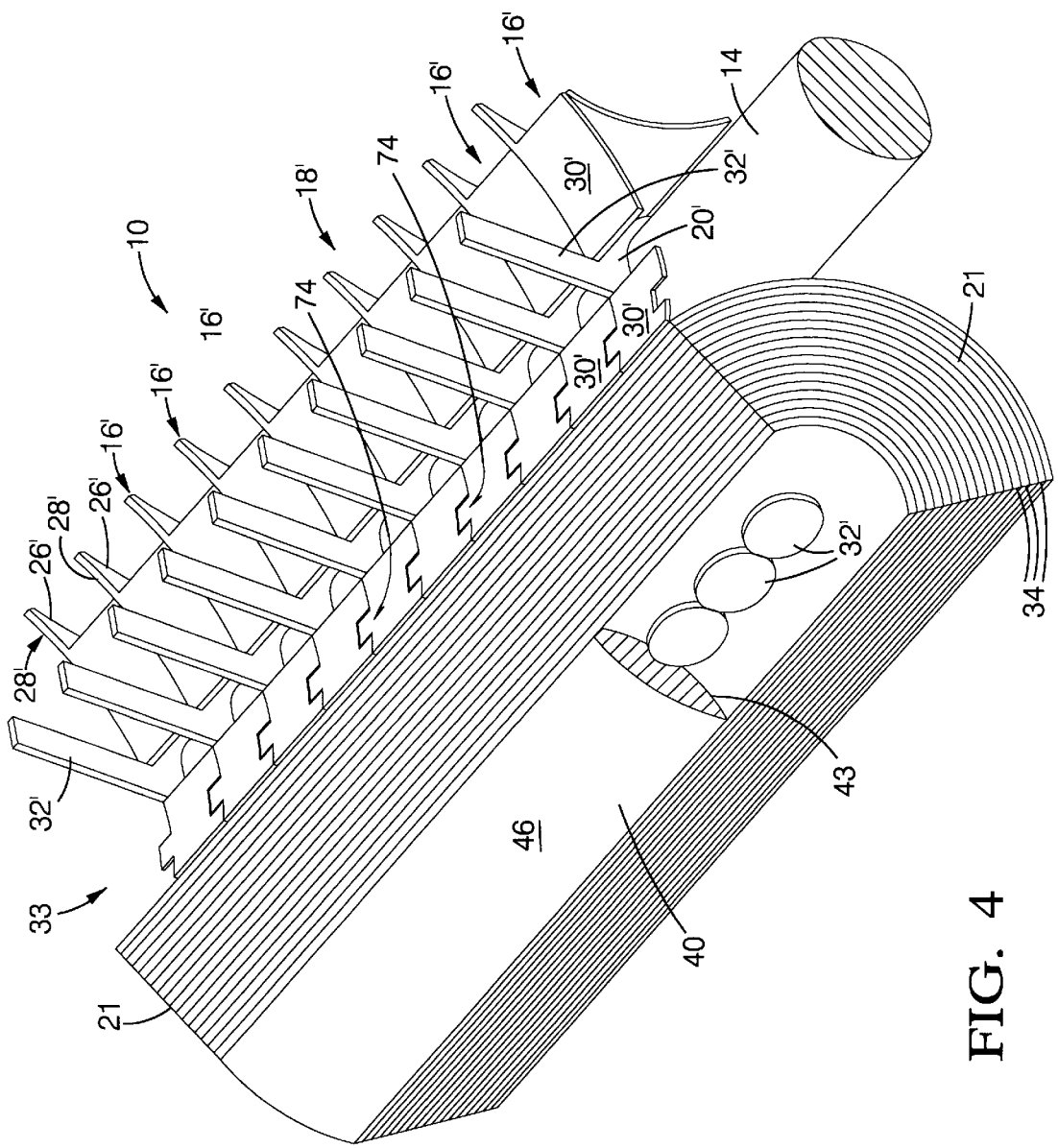
FIG. 4 is a perspective view of a partially assembled synchronous reluctance rotor assembly of FIG. 3 having a portion of a rotor bar shown in cross section.

The laminated rotor sections 21 include a plurality of radially stacked, arcuate, magnetic laminations 34, whereby the curvature of the outer convex surface 36 of each rotor section 21 is complementary to the curvature of the valleys 28 of the star-shaped supports 16 for mating thereto. Each rotor section 21 includes a plurality of rectangular apertures 38, best shown in FIGS. 2 and 3, disposed axially along and radially through the base of the arcuate rotor sections 21. The slots 38 are spaced to align with and shaped to receive the mounting members 32. The rotor sections 21 are secured to the star-shaped supports 16 by orbitally formed free ends of the mounting members 32 as shown in FIGS. 1 and 4. In the alternative as shown in FIG. 3, the free ends of the mounting members 32 may also be split radially to form a pair of tabs 39 that are bent over to secure the rotor sections 21 to the star-shaped supports 16. Note that the free ends of the mounting members 32 in FIG. 3 are shown bent over in axial opposition for illustrative purposes. As described above, the ends of the tabs 32 are bent over, or formed, after the rotor sections 21 are mounted to the star-shaped supports 16.

As shown in FIG. 1, rotor bars 40, formed of non-magnetic material such as fiberglass, are mounted within the inner concave cavity 42 of the rotor sections 21. The rotor bars 40 have an inner convex surface 43 that is complementary to the concave cavity 42 of the rotor section. The inner surface 43 of the rotor bar also includes an axial channel 44 for receiving and snapfitting to the orbitally formed ends of the mounting elements 32. Alternatively, the rotor bars 40 may also be adhered to the rotor sections using an adhesive. The outer surface 46 of the rotor bars 40 are rounded to have a radius equal to the outer radius of the rotor 12. The rotor bar 40 reduces the audible noise associated with the high speed of rotation of the rotor 12 during operation.

Figure 2:
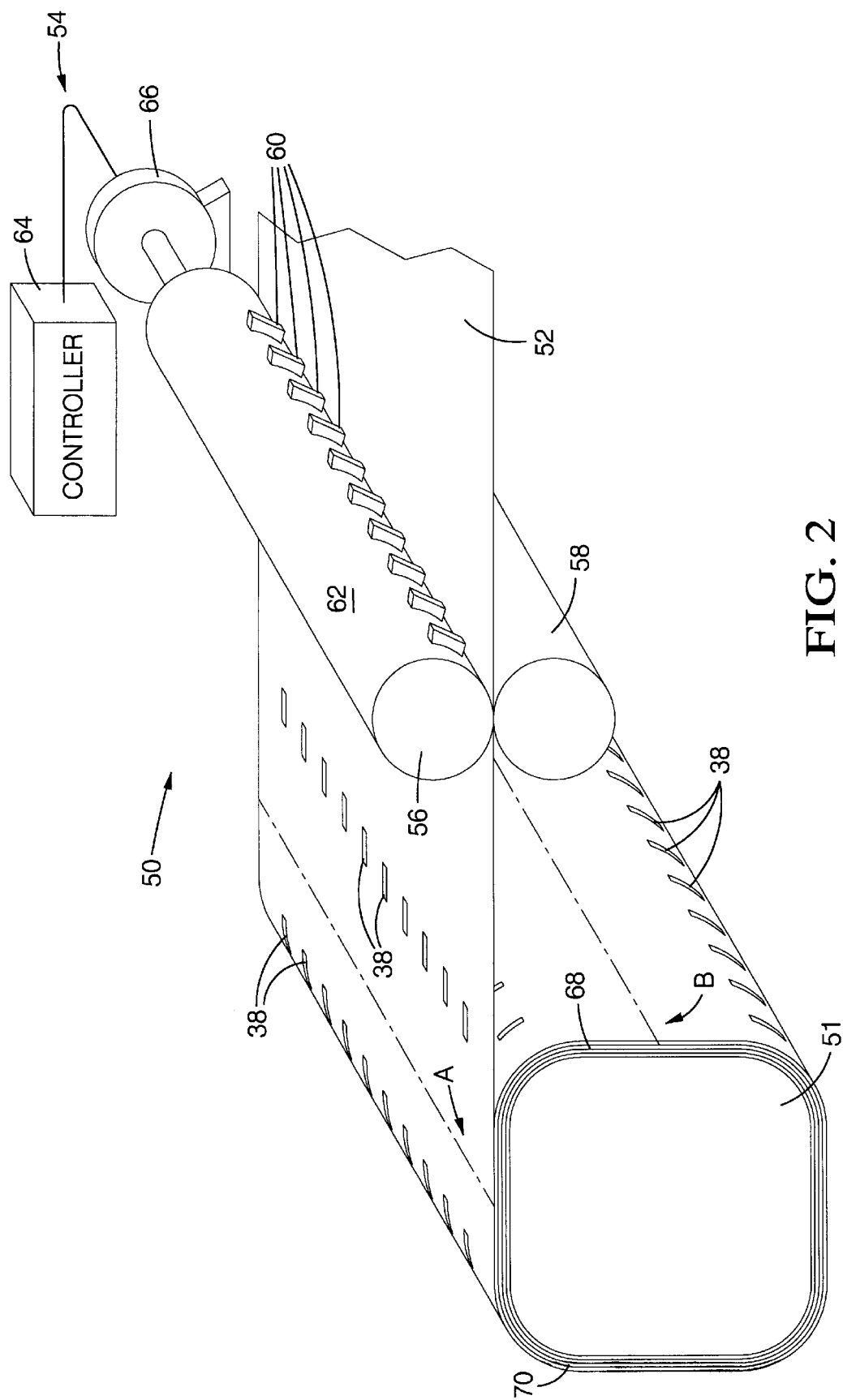
FIG. 2 is a perspective view of a system for forming the laminated sections of the synchronous reluctance rotor assembly of FIG. 1 shown at a point during its manufacturing process.

FIG. 2 illustrates a system 50 for forming the laminated rotor sections 21 and the apertures 38 disposed therethrough. The system includes a mandrel 51 for coiling the steel laminate sheet 52 in a generally square shape and an indexing machine 54 for punching or stamping the apertures 38 into the steel sheet 52 as it is being coiled about the mandrel 51. The indexing machine 54 includes a pair of parallel rollers 56, 58 wherein the upper indexing roller 56 has a plurality of rectangular elements 60 extending from the outer surface 62 thereof for punching the apertures 38 into the steel sheet 52 as it passes between the rollers 56, 58 and coils around the mandrel 51. A controller 64 operates a motor 66 which rotates the indexing roller 56. The controller adjusts the rate of rotation of the indexing roller 56 to insure that the slots of each layer of lamination are aligned at the corners of the mandrel. The adjustment to the rate of rotation of the upper roller 56 is necessary because as the diameter of the laminated coil 68 increases with each turn, the distance between each row of apertures 38 correspondingly increases. Therefore, in order to insure the alignment of the slots 38 through each layer of a laminated rotor section 21, the rate of rotation of the indexing roller 56 must be continually decreased.

It will be appreciated by one skilled in the art that the indexing roller 56 of the indexing machine 54 of the embodiment shown in FIG. 3 may be substituted for a reciprocating stamp (not shown). The reciprocating stamp also includes a plurality of rectangular elements 60 that define the apertures 38 punched into the steel sheet 52. Similar to the operation of the embodiment shown in FIG. 2, the controller 64 controls the reciprocation of the stamp to accommodate for the increasing diameter of the laminated coil 68.

After the laminated coil 68 is removed from the mandrel 51, the outer edges 70 of the coil 68 layer are temporarily secured together, such as by welding. The laminated coil 68 is then longitudinally cut in quarters such as along broken lines A and B in FIG. 2 to form four arcuate laminated rotor sections 21 (see FIG. 1). A detailed description of a mandrel-wrap rotor construction is found in co-pending application, ROTOR FOR A SYNCHRONOUS RELUCTANCE MACHINE, Attorney Docket No. H198659, which is herein incorporated by reference in its entirety.

Referring to FIGS. 3 and 4, an alternative embodiment of the present invention is shown. The rotor assembly 18 includes a plurality of star-shaped supports 16 for attachment to the shaft 14. Each star-shaped support 16 is cut and formed through a progressive stamping process to a form a star-shaped support having a body portion 20 with a central axial bore 22 extending therethrough. A collar 72 extends axially outward from the body portion 20 about the central bore 22. Four, equiangularly spaced arms 26 radiate outwardly from the body portion 20. Valleys 28 are disposed between the circumferentially adjacent arms 26, which provide a surface 30' that extends axially from the arms 26 and body portion 20 of the star-shaped support 16 to provide support for the laminated rotor sections 21 at spaced relations to the shaft 14. Each valley has an arcuate cross section. The star-shaped supports also have a plurality of mounting members 32 extending from the body portion 20 at the base of each valley 28 to secure the rotor sections 21 thereto, as described hereinbefore with respect to the embodiment of FIG. 1.

An important feature of the embodiment of the star-shaped supports 16 (shown in FIGS. 3 and 4) is that the collar 72 and the support surfaces 30' of the valleys 28 extend axially from the body portion 20 of the star-shaped supports with substantially the same spacing as that between the apertures 38 of the rotor sections 21. This feature simplifies the locating of the star-shaped supports relative to each other along the shaft 14 when assembling the rotor assembly. When the core 18 is assembled, the star-shaped supports 16 are properly spaced on the shaft 14 by pressing and stacking each star-shaped support 16 against the other on the shaft. In addition, each star-shaped support may include an interlocking feature 74 that mates with an adjacent star-shaped support to accurately orient the star-shaped supports on the shaft 14 to align the valleys 28 and mounting members 32.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

It is claimed:

1. A system for forming laminated rotor sections of a synchronous reluctance motor; said system comprising:
    a mandrel for coiling a sheet of magnetic material therearound;
    a stamp having a plurality of elements for punching a plurality of apertures through said magnetic sheet material;
    an actuator for operating said stamp; and
    a controller for driving said actuator at predetermined intervals to insure alignment of said apertures of each laminate layer.

2. The system, as defined in claim 1, wherein said stamp is a roller that is rotted to insure alignment of said slots of each laminate layer.

3. The system, as defined in claim 1, wherein said stamp is reciprocated to insure alignment of said slots of each laminate layer.

* * * * *